Patented Dec. 24, 1940

2,226,111

UNITED STATES PATENT OFFICE 2,226,111

AMINO PYRIDO-PYRIDINES AND A METHOD OF MAKING THE SAME

Arthur Binz, Berlin-Grunewald, and Otto von Schickh, Ludwigshafen-on-the-Rhine, Germany, assignors to Schering Corporation, Bloomfield, N. J., a corporation of New Jersey No Drawing. Application May 31, 1939, Serial No. 276,648. In Germany June 3, 1938

7 Claims. (Cl. 260—296)

This invention relates to amino pyrido-pyridines and more particularly to amino 1.5-pyrido-pyridines and a method of making the same. Hitherto, amino 1.5-pyrido-pyridines have been made by methods that can be carried out only with great difficulty and with a very poor yield, for instance, 2.5-diamino pyridine is condensed according to the method of Skraup or ammonia has been allowed to react with 2-chloro iso-1.5-pyrido-pyridine.

Now it has been found that amino-1.5-pyrido-pyridine can be made very readily and in a very good yield by reducing halogeno nitro-1.5-pyrido-pyridines according to known methods for the reduction of a nitro group to an amino group, for example, as described in Houben, "Die Methoden der Organischen Chemie," 3rd edition, vol. II, pp. 378 et seq., and especially pages 389–391. Thereby, for instance, the hitherto unknown 3-amino 1.5-pyrido-pyridine is obtained. These compounds show physiological activity and can also be used as intermediate products for the manufacture of other valuable compounds. The following example serves to illustrate the invention without, however, limiting the same to it.

Example 2-hydroxy-1.5-pyrido-pyridine is transformed into the 2-hydroxy-3-nitro-1.5-pyrido-pyridine according to the method described by O. Muehlbock, Dissertation Berlin, 1927, pages 14 and 15. 12 gs. of the latter compound are heated with 25 gs. of phosphorus oxychloride and 16 gs. of phosphorus pentachloride at 130° C. After removing the phosphorus oxychloride by vacuum distillation the residue is decomposed by means of ice and recrystallised from ethanol. Needles of 2-chloro-3-nitro-1.5-pyrido-pyridine having a melting point of 205° C. are obtained with a yield of 65%.

6.8 gs. of this 2-chloro-3-nitro-1.5-pyrido-pyridine are dissolved in 200 ccs. of methanol and hydrogenated with hydrogen in the presence of 5.5 gs. of a palladium catalyst, made according to Berichte der Deutschen Chemischen Gessellschaft, vol. 79, page 1063, which is added in four portions to the reaction mixture. Within 27 hours 2900 ccs. of hydrogen are taken up whereafter the reaction is interrupted in order to avoid hydrogenation of the pyrido-pyridine nucleus. Thereafter the catalyst is filtered off, hydrochloric acid added to the filtrate and the solution concentrated by evaporation. Thereby 6 gs. of the tri-chlorohydrate of 3-amino-1.5-pyrido-pyridine having a melting point of 249° C., with decomposition, are obtained. It is converted into the free 3-amino-1.5-pyrido-pyridine according to customary methods.

The hydrogenation can also be carried out with other agents and methods capable of reducing nitro groups. The above described catalytic reduction method, however, has proved to be the best.

The above reactions may be represented by the following structural formulae:

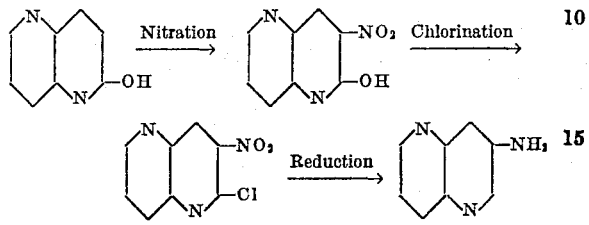

In the same manner there may be obtained from the corresponding halogen nitro-1.5-pyrido-pyridine also other amino-1.5-pyrido-pyridine, such as the 4-, 6-, or 8-amino-1.5-pyrido-pyridine.

Of course, many other changes and variations may be made by those skilled in the art in accordance with the principles set forth herein and in the claims annexed hereto.

What we claim is:

1. A process for making amino-1.5-pyrido-pyridines comprising subjecting halogeno nitro-1.5-pyrido-pyridines to the action of an agent capable of reducing a nitro group to an amino group.

2. A process according to claim 1 wherein the reduction is carried out with hydrogen in the presence of a catalyst.

3. A process according to claim 1 wherein the reduction is carried out with hydrogen in the presence of a palladium catalyst.

4. A process according to claim 1 wherein 2-chloro-3-nitro-1.5-pyrido-pyridine is used as starting material.

5. 3-amino 1.5-pyrido-pyridine.

6. A process according to claim 1, wherein 2-chloro-3-nitro-1.5-pyrido-pyridine is used as starting material, and wherein the reduction is carried out with hydrogen in the presence of a catalyst.

7. A process according to claim 1, wherein 2-chloro-3-nitro-1.5-pyrido-pyridine is used as starting material, and wherein the reduction is carried out with hydrogen in the presence of a palladium catalyst.

ARTHUR BINZ.
OTTO VON SCHICKH.